United States Patent
Hassanzadeh et al.

(10) Patent No.: US 11,522,882 B2
(45) Date of Patent: *Dec. 6, 2022

(54) DETECTION OF ADVERSARY LATERAL MOVEMENT IN MULTI-DOMAIN IIOT ENVIRONMENTS

(71) Applicant: Accenture Global Solutions Limited, Dublin (IE)

(72) Inventors: Amin Hassanzadeh, Arlington, VA (US); Azzedine Benameur, Fairfax, VA (US); Robin Lynn Burkett, Alexandria, VA (US); Apoorv Krishak, Cary, NC (US); Chien An Chen, Fairfax, VA (US); Nahid Farhady Ghalaty, Falls Church, VA (US)

(73) Assignee: Accenture Global Solutions Limited, Dublin (IE)

( * ) Notice: Subject to any disclaimer, the term of this patent is extended or adjusted under 35 U.S.C. 154(b) by 229 days.

This patent is subject to a terminal disclaimer.

(21) Appl. No.: 17/073,535

(22) Filed: Oct. 19, 2020

(65) Prior Publication Data
US 2021/0037029 A1 Feb. 4, 2021

Related U.S. Application Data

(63) Continuation of application No. 15/808,655, filed on Nov. 9, 2017, now Pat. No. 10,812,499.

(51) Int. Cl.
*H04L 9/40* (2022.01)
*H04L 41/22* (2022.01)
(Continued)

(52) U.S. Cl.
CPC ........ *H04L 63/1416* (2013.01); *G06F 21/552* (2013.01); *G06F 21/556* (2013.01);
(Continued)

(58) Field of Classification Search
CPC ............ H04L 63/1416; H04L 41/0631; H04L 41/147; H04L 41/22; H04L 63/0227;
(Continued)

(56) References Cited

U.S. PATENT DOCUMENTS

| 7,376,969 B1 | 5/2008 | Njemanze et al. |
| 8,176,527 B1 | 5/2012 | Njemanze et al. |

(Continued)

FOREIGN PATENT DOCUMENTS

| EP | 3079336 | 10/2016 |
| WO | WO 2014/109645 | 7/2014 |

OTHER PUBLICATIONS

Australia Office Action in Application No. 2016202184, dated Apr. 29, 2016, 5 pages.
(Continued)

*Primary Examiner* — Mohammad W Reza
(74) *Attorney, Agent, or Firm* — Fish & Richardson P.C.

(57) ABSTRACT

Implementations are directed to methods for detecting and identifying advanced persistent threats (APTs) in networks, including receiving first domain activity data from a first network domain and second domain activity data from a second network domain, including multiple alerts from the respective first and second network domains and where each alert of the multiple alerts results from one or more detected events in the respective first or second network domains. A classification determined for each alert of the multiple alerts with respect to a cyber kill chain. A dependency is then determined for each of one or more pairs of alerts and a graphical visualization of the multiple alerts is generated, where the graphical visualization includes multiple nodes and edges between the nodes, each node corresponding to the cyber kill chain and representing at least one alert, and each edge representing a dependency between alerts.

20 Claims, 8 Drawing Sheets

(51) Int. Cl.
| | |
|---|---|
| *H04L 41/147* | (2022.01) |
| *G06N 7/00* | (2006.01) |
| *H04L 41/0631* | (2022.01) |
| *G06N 20/00* | (2019.01) |
| *G06F 21/55* | (2013.01) |
| *H04L 67/10* | (2022.01) |

(52) U.S. Cl.
CPC ............. *G06N 7/005* (2013.01); *G06N 20/00* (2019.01); *H04L 41/0631* (2013.01); *H04L 41/147* (2013.01); *H04L 41/22* (2013.01); *H04L 63/0227* (2013.01); *H04L 63/1425* (2013.01); *H04L 63/1433* (2013.01); *H04L 67/10* (2013.01)

(58) Field of Classification Search
CPC . H04L 63/1425; H04L 63/1433; H04L 67/10; G06F 21/552; G06F 21/556; G06N 7/005; G06N 20/00
See application file for complete search history.

(56) References Cited

U.S. PATENT DOCUMENTS

| | | | |
|---|---|---|---|
| 8,307,444 | B1 | 11/2012 | Mayer et al. |
| 9,124,636 | B1 | 9/2015 | Rathor |
| 9,378,361 | B1 | 6/2016 | Yen et al. |
| 9,712,554 | B2 | 7/2017 | Hassanzadeh et al. |
| 9,742,788 | B2 | 8/2017 | Hassanzadeh et al. |
| 10,397,255 | B1* | 8/2019 | Bhalotra ............ H04L 63/1425 |
| 2006/0129810 | A1 | 6/2006 | Jeong et al. |
| 2006/0212931 | A1 | 9/2006 | Shull et al. |
| 2007/0209074 | A1 | 9/2007 | Coffman |
| 2009/0113550 | A1 | 4/2009 | Costa et al. |
| 2010/0058456 | A1 | 3/2010 | Jajodia et al. |
| 2011/0252032 | A1 | 10/2011 | Fitzgerald et al. |
| 2012/0224057 | A1 | 9/2012 | Gill et al. |
| 2013/0067067 | A1 | 3/2013 | Miri et al. |
| 2014/0007241 | A1 | 1/2014 | Gula et al. |
| 2014/0096251 | A1 | 4/2014 | Doctor et al. |
| 2014/0337500 | A1 | 11/2014 | Lee |
| 2014/0380488 | A1 | 12/2014 | Datta Ray et al. |
| 2015/0058993 | A1 | 2/2015 | Choi et al. |
| 2015/0074806 | A1 | 3/2015 | Roundy et al. |
| 2016/0301704 | A1 | 10/2016 | Hassanzadeh et al. |
| 2016/0301709 | A1 | 10/2016 | Hassanzadeh et al. |
| 2016/0308898 | A1* | 10/2016 | Teeple ............... H04L 63/1441 |
| 2017/0318050 | A1 | 11/2017 | Hassanzadeh |
| 2018/0248893 | A1* | 8/2018 | Israel ................. H04L 63/1433 |
| 2019/0098036 | A1* | 3/2019 | Kyle .................... H04L 43/065 |
| 2019/0141058 | A1 | 5/2019 | Hassanzadeh et al. |

OTHER PUBLICATIONS

Australian Office Action for Application No. 2016202191, dated Jan. 25, 2017, 10 pages.
Australian Office Action for Application No. 2016202191, dated Jul. 7, 2017, 10 pages.
Australian Office Action in Application No. 2016202191, dated Jul. 8, 2016, 5 pages.
Briesemeister et al., "Detection, Correlation, and Visualization of Attacks Against Critical Infrastructure Systems," Eighth Annual Conference on Privacy, Security and Trust, Ottawa, Ontario, Canada, Aug. 2010, 8 pages.
Canadian Office Action for Application No. 2,926,579, dated Dec. 19, 2017, 5 pages.
Canadian Office Action for Application No. 2,926,579, dated Jan. 17, 2017, 6 pages.
Canadian Office Action for Application No. 2,926,603, dated Dec. 19, 2017, 3 pages.
Canadian Office Action for Application No. 2,926,603, dated Jan. 18, 2017, 6 pages.
Caselli et al., "Sequence-aware Intrusion Detection in Industrial Control Systems," CPSS'5, Apr. 2015, pp. 13-24.
European Office Action in Application No. 16 164 616.1, dated Jun. 28, 2016, 6 pages.
European Office Action in Application No. 16164614.6, dated Jul. 12, 2016, 5 pages.
European Search Report and Written Opinion in Application 18192241. 0, dated Mar. 14, 2019, 8 pages.
European Search Report in Application No. 16164614.6, dated Jun. 23, 2016, 4 pages.
European Search Report in Application No. 16164616.1, dated Jun. 13, 2016, 4 pages.
Friedberg et al., "Combating advanced persistent threats: From network event correlation to incident detection," Computers and Security, 2015, 48:35-57.
Gong et al. "Characterizing Intrusion Tolerant Systems Using A State Transition Model," Darpa Discex II Conference, 2001, 10 pages.
Homer, J. et al. "A sound and practical approach to quantifying security risk in enterprise networks," Kansas State University Technical Report, Aug. 1, 2009. (online) retrieved from the internet on Jul. 7, 2016, http://www.cse.usf.edu/~xou/publications/tr_homer_0809.pdf.
Hutchins et al., "Intelligence-Driven Computer Network Defense Informed by Analysis of Adversary Campaigns and Intrusion Kill Chains," Proceedings of the 6th International Conference on Information Warfare and Security (ICIW '11); Mar. 2011, 14 pages.
Hutchins et al., "Intelligence-driven computer network defense informed by analysis of adversary campaigns and intrusion kill chains," International Journal of Critical Infrastructure Protection, Dec. 1, 2015, 14 pages.
Mathew et al., "Understanding Multistage Attacks by AttackTrack Based Visualization of Heterogeneous Event Streams," VizSEC 06, Nov. 2006, 5 pages.
Mehta, V. et al. "Ranking attack graphs," International Workshop on Recent Advances in Intrusion Detection, (pp. 127-144). Sep. 20, 2006, (online) retrieved from the internet on Jul. 5, 2016, http://www.cs.cmu.edu/~emc/papers/Conference%20Papers/Ranking%20Attack%20Graphs.pdf.
Noel S. et al. "Advanced vulnerability analysis and intrusion detection through predictive attack graphs," Critical Issues in C4I, Armed Forces Communications and Electronics Association (AFCEA) Solutions Series. International Journal of Command and Control. May 2009, (online) retrieved from the internet on Jul. 7, 2016, http://citeseerx.ist.psu.edu/viewdoc/download?doi=10.1.1.704.4878&rep=rep1&type=pdf.
Skopik and Fiedler, "Intrusion Detection in Distributed Systems using Fingerprinting and Massive Event Correlation," in Matthias Horbach, ed., 'GI-Jahrestagung,' 2013, 15 pages.
Spadaro, A., "Event correlation for detecting advanced multi-stage cyber-attacks," M.Sc. Thesis, Delft University of Technology, 2013, 151 pages.
United States Office Action in U.S. Appl. No. 15/651,779, dated Dec. 15, 2017, 11 pages.
Valeur et al., "A Comprehensive Approach to Intrusion Detection Alert Correlation," IEEE Transactions on Dependable and Secure Computing, 2004, 1(3):1-23.
Valeur, F., "Real-Time Intrusion Detection Alert Correlation", Doctoral Dissertation, University of California, Santa Barbara, 2006, 199 pages.
Wang, L. et al. "Measuring the overall security of network configurations using attack graphs," IFIP Annual Conference on Data and Applications Security and Privacy (pp. 98-112), Jul. 8, 2007. (online) retrieved from the internet on Jul. 7, 2016, http://craigchamberlain.com/library/metrics/Measuring%20Overall%20Security%20With%20Attack%20Graphs.pdf.

* cited by examiner

DETECTION OF ADVERSARY LATERAL MOVEMENT IN MULTI-DOMAIN IIOT ENVIRONMENTS

CROSS-REFERENCE TO RELATED APPLICATION

This application is a continuation of U.S. patent application Ser. No. 15/808,655, entitled "DETECTION OF ADVERSARY LATERAL MOVEMENT IN MULTI-DOMAIN IIOT ENVIRONMENTS," filed Nov. 9, 2017, which is incorporated herein by reference in its entirety.

BACKGROUND

The present disclosure relates to security and network operations.

SUMMARY

In general, one innovative aspect of the subject matter described in this specification can be embodied in methods for detecting and identifying advanced persistent threats (APTs) in networks including receiving first domain activity data from a first network domain (e.g., an information technology network domain) and second domain activity data from a second network domain (e.g., an operational technology network domain), where the first domain activity data and the second domain activity data include multiple alerts from the respective first and second network domains and where each alert of the multiple alerts results from one or more detected events in the respective first or second network domains. For each alert of the multiple alerts, a classification of the alert is determined with respect to a cyber kill chain (e.g., information technology cyber kill chain or industrial control system cyber kill chain). A dependency is then determined for each of one or more pairs of alerts and a graphical visualization of the multiple alerts is generated, where the graphical visualization includes multiple nodes and edges between the nodes, each node corresponding to the cyber kill chain and representing at least one alert, and each edge representing a dependency between alerts. Other implementations of this aspect include corresponding systems, apparatus, and computer programs, configured to perform the actions of the methods, encoded on computer storage devices.

These and other implementations can each optionally include one or more of the following features. In some implementations, classification of the alert includes surveying one or more devices in a local network included in the first network domain and the second network domain and/or include obtaining threat intelligence data from one or more global threat databases. Classification of the alert can include labeling the alert by one or more machine-learning algorithms trained using training data including multiple labeled alerts (e.g., labeled by human experts). In some implementations, classification of the alert includes applying one or more labels to the alert by an expert.

In some implementations, determining the dependency for each of one or more pairs of alerts includes identifying at least one prerequisite step to the particular step of the cyber kill chain process corresponding to the one or more pairs of alerts and at least one consequence step for the particular step of the cyber kill chain process corresponding to the one or more pairs of alerts, and where the at least one prerequisite and the at least one consequence for each of one or more pairs of alerts depends in part on the classification of the alerts.

In some implementations, each alert of the multiple alerts, having a set of one or more prerequisite steps and one or more consequence steps, is correlated with each other alert of the multiple alerts having a same set of one or more prerequisite step and one or more consequence steps.

In some implementations, generating a graphical visualization of the multiple alerts includes, for each given alert of the multiple alerts, designating at least one edge between the given alert and one other alert of the multiple alerts, where the edge represents a prerequisite step or a consequence step for the given alert.

In some implementations, generating a graphical visualization of the multiple alerts includes generating an adversary prediction model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

Particular embodiments of the subject matter described in this specification may be implemented so as to realize one or more of the following advantages. Classifying alerts generated by an information technology (IT) and operational technology (OT) network with steps of a cyber kill chain (CKC) including an information technology cyber kill chain (IT CKC) and/or an industrial control system cyber kill chain (ICS CKC)) and one or more attack graphs assists in threat-hunting, and can improve prediction of next steps taken by an adversary in order to take counter-measures. Alert enrichment utilizing local (e.g., local area network surveys) and/or global information (e.g., threat intelligence databases) can assist in more effectively characterizing an alert and labeling the alert as a step in the IT CKC and/or ICS CKC. Machine-learning analysis, semi-supervised machine-learning techniques, and/or human expert labeling of the alert with respective prerequisite and consequence steps of the IT CKC and/or ICS CKC can be used to generate a correlation graph visualizing possible attack paths by adversaries for a particular industrial Internet-of-things (IIOT) network. IIOT network visibility and threat intelligence knowledge combined into a correlation graph can then be used to predict potential attack paths by adversaries as well as validate existing malicious behaviors.

The details of one or more implementations of the present disclosure are set forth in the accompanying drawings and the description below. Other features and advantages of the present disclosure will be apparent from the description and drawings, and from the claims.

DETAILED DESCRIPTION

This specification describes systems, methods, and computer programs for detecting and identifying advanced persistent threats (APTs) in networks. For example, an industrial internet may be used to manage and administer industrial control systems (ICS), which may communicate over an enterprise network and may include information technology (IT), and operational technology (OT) domains. Some threat scenarios may include multi-step, multi-domain attacks, and may include attacks that originate in one domain, and proceed to another domain. By filtering, aggregating, and correlating data from event/alert logs from each domain (e.g., IT and OT domains), and classifying each alert with a respective step in an IT cyber kill chain (IT CKC) and/or an industrial control system cyber kill chain (ICS CKC), for example, complex attack patterns may be detected. Information about the attack patterns (e.g., visualization data) may be reported to a security analyst, and may be used for implementing appropriate courses of action.

In general, innovative aspects of the subject matter described in this specification can be embodied in methods for detecting and identifying advanced persistent threats (APTs) in networks including receiving first domain activity data from a first network domain (e.g., an information technology network domain) and second domain activity data from a second network domain (e.g., an operational technology network domain), where the first domain activity data and the second domain activity data include multiple alerts from the respective first and second network domains and where each alert of the multiple alerts results from one or more detected events in the respective first or second network domains. For each alert of the multiple alerts, a classification of the alert is determined with respect to a cyber kill chain (e.g., information technology cyber kill chain or industrial control system cyber kill chain). A dependency is then determined for each of one or more pairs of alerts and a graphical visualization of the multiple alerts is generated, where the graphical visualization includes multiple nodes and edges between the nodes, each node corresponding to the cyber kill chain and representing at least one alert, and each edge representing a dependency between alerts.

Figure 1:
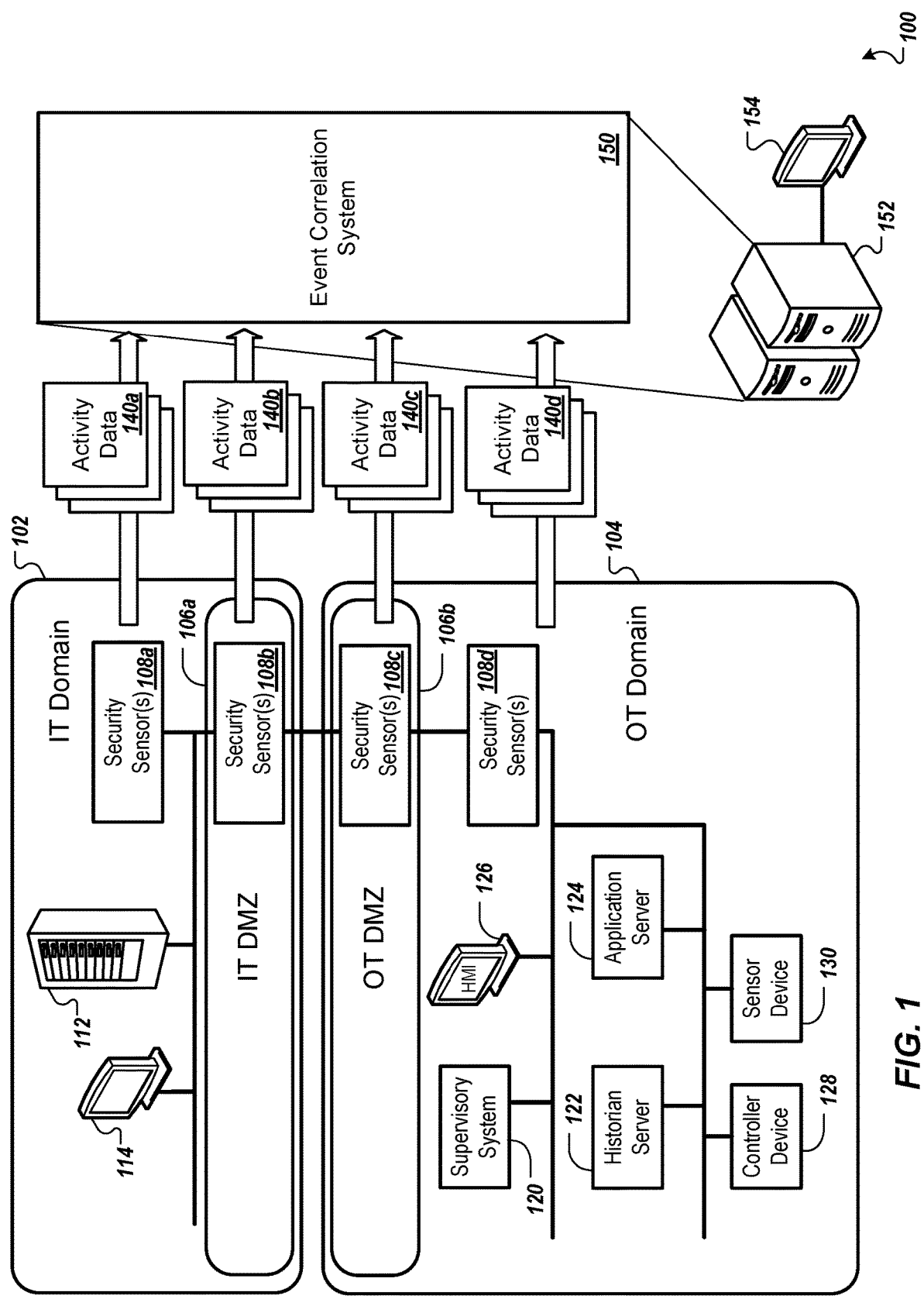
FIGS. 1-3 depict example systems that can execute implementations of the present disclosure.

FIG. 1 depicts an example system 100 that can execute implementations of the present disclosure. In the present example, the system 100 (e.g., an industrial control system) includes multiple network domains, including an information technology (IT) network domain 102 (e.g., including an enterprise network) and an operational technology (OT) network domain 104. The information technology network domain 102 and the operational technology network domain 104 can be in communication, for example, over a demilitarized zone (DMZ) 106a of the information technology network domain 102 and a demilitarized zone (DMZ) 106b of the operational technology network domain 104. Each of the network domains 102 and 104, for example, may include local and wide area networks (LAN/WAN), wired and/or wireless networks. Example network domains can include building and control networks (BACnet), near field communication (NFC) networks, or the like). Each of the network domains 102 and 104 can be used to integrate various computing devices, such as servers, mainframes, desktops, laptops, tablets, smartphones, and industrial control devices and sensors, that may run on multiple different operating systems and may employ multiple different communication protocols.

The information technology (IT) network domain 102 can include various computing devices (e.g., computing server 112), input/output devices (e.g., interface device 114), and/or subsystems. The computing server 112, for example, can include one or more processors configured to execute instructions stored by computer-readable media for performing various operations, such as input/output, communication, data processing, and/or data maintenance. To interact with the computing server, for example, a user can employ the interface device 114 (e.g., including one or more presentation components, such as a display, and one or more input components such as a keyboard, mouse, and/or touchpad).

The operational technology (OT) network domain 104 can include various computing devices, input/output devices, and/or subsystems. In the present example, the operational technology network domain 104 includes a supervisory system 120, a historian server 122, an application server 124, one or more human-machine interface (HMI) devices (e.g., HMI device 126), and one or more controller devices (e.g., controller device 128) and sensor devices (e.g., sensor device 130). The supervisory system 120, for example, can coordinate one or more low-level controls and/or low-level sensors. In the present example, the supervisory system 120 can provide data to and receive data from the controller device 128 and the sensor device 130. The historian server 122, for example, can store, maintain, and provide information related to activities performed by each controller device and sensor data provided by each sensor device in the operational technology network domain 104. The application server 124, for example, can host applications that may operate within the operational technology network domain 104.

In some implementations, the system 100 may include one or more security sensors (e.g., security sensors 108a, 108b, 108c, and 108d). In general, security sensors included in the system 100 may include network based (NIDS) and host based (HIDS) intrusion detection systems, intrusion prevention systems (IPS), anti-virus systems, firewalls, and other detection/logging services (e.g., web server logs, database logs, etc.) which can monitor communications activity to and from computing devices included in the industrial technology (IT) network domain 102, the IT DMZ 106a, the operational technology (OT) network domain 104, and/or the OT DMZ 106b, and can monitor system activity associated with the devices. Data associated with potentially malicious activity may be detected (and optionally, recorded) by the security sensors 108a, 108b, 108c, and 108d (e.g., as event/alert data, log files, etc.), and/or other detection/logging devices included in the system 100, and/or may be provided to other components of the system 100. For example, activity data 140*a*, 140*b*, 140*c*, and 140*d* (e.g., detected by the corresponding security sensors 108*a*, 108*b*, 108*c*, and 108*d*) may be provided to an event correlation system 150. Such activity data may also be provided to an event correlation system 150 by a Security Information and Event Management (SIEM) system. The activity data 140*a*, for example, may include enterprise data from the information technology network domain 102, provided by host-based monitoring systems (e.g., intrusion detection/prevention systems, web server logging services, system logs, etc.) and/or network-based monitoring systems (e.g., intrusion detection/prevention systems, firewalls, routers, etc.). The activity data 140*b*, for example, may include data associated with communication over the IT DMZ 106*a*. The activity data 140*c*, for example, may include data associated with communication over the OT DMZ 106*b*. The activity data 140*d*, for example, may include supervisory data, control layer data, and/or sensor and controller device data from the operational technology network domain 104, provided by host-based monitoring systems and/or network-based monitoring systems.

In the present example, each of the activity data 140*a*, 140*b*, 140*c*, and 140*d* may include event and/or alert data. In general, events are atomic pieces of data associated with communications and system activity, whereas alerts may be triggered in response to an event or a sequence of events. Data provided by the security sensors 108*a*, 108*b*, 108*c*, and 108*d*, for example, may include alert data. Data provided by a host (e.g., the computing server 112), controller device (e.g., the controller device 128) or sensor device (e.g., the sensor device 130), or data included in log files, for example, may include event data.

The event correlation system 150, for example, can receive the activity data 140*a*, 140*b*, 140*c*, and 140*d* from multiple domains (e.g., the information technology (IT) network domain 102, the IT DMZ 106*a*, the operational technology (OT) network domain 104, and the OT DMZ 106*b*), and can standardize, filter, aggregate, and correlate the data to detect anomalies and potentially malicious activity associated with multi-stage, multi-domain attacks. In the present example, the event correlation system 150 can include various computing devices (e.g., computing server 152), input/output devices (e.g., interface device 154), and/or subsystems. The computing server 152, for example, can include one or more processors configured to execute instructions stored by computer-readable media for performing various operations, such as input/output, communication, data processing, and/or data maintenance. To interact with the computing server, for example, a user can employ the interface device 154 (e.g., including one or more presentation components, such as a display, and one or more input components such as a keyboard, mouse, and/or touchpad).

In some implementations, output may be provided by the event correlation system 150 to another system (e.g., a security information and event management (SIEM) system) and/or to a system operator as reporting/visualization data (e.g., in the form of an attack graph or attack tree). Based on the system output, for example, appropriate courses of action may be employed to counter ongoing and/or future attacks. In the present example, the information technology (IT) network domain 102, the IT DMZ 106*a*, the operational technology (OT) network domain 104, and the OT DMZ 106*b* each has different characteristics (e.g., architecture, resources, protocols, and standards), and each domain may be susceptible to different security threats. Occasionally, correlations may not be detected among events/alerts within a single domain, (and if correlations are detected, an extent of an associated compromise may not be entirely known), but correlations may be detected among events/alerts across multiple domains. By correlating data from multiple domains, for example, complex attacks (e.g., multi-stage, multi-domain attacks executed over time) may be detected, and a single vantage point may be provided to security technicians.

In some implementations, one or more attack paths can be determined, each representing a potential path an adversary can take to get into different targets in the network, and stored in an attack path database (e.g., attack path database 520 as discussed in more detail with reference to FIG. 5).

Figure 2:
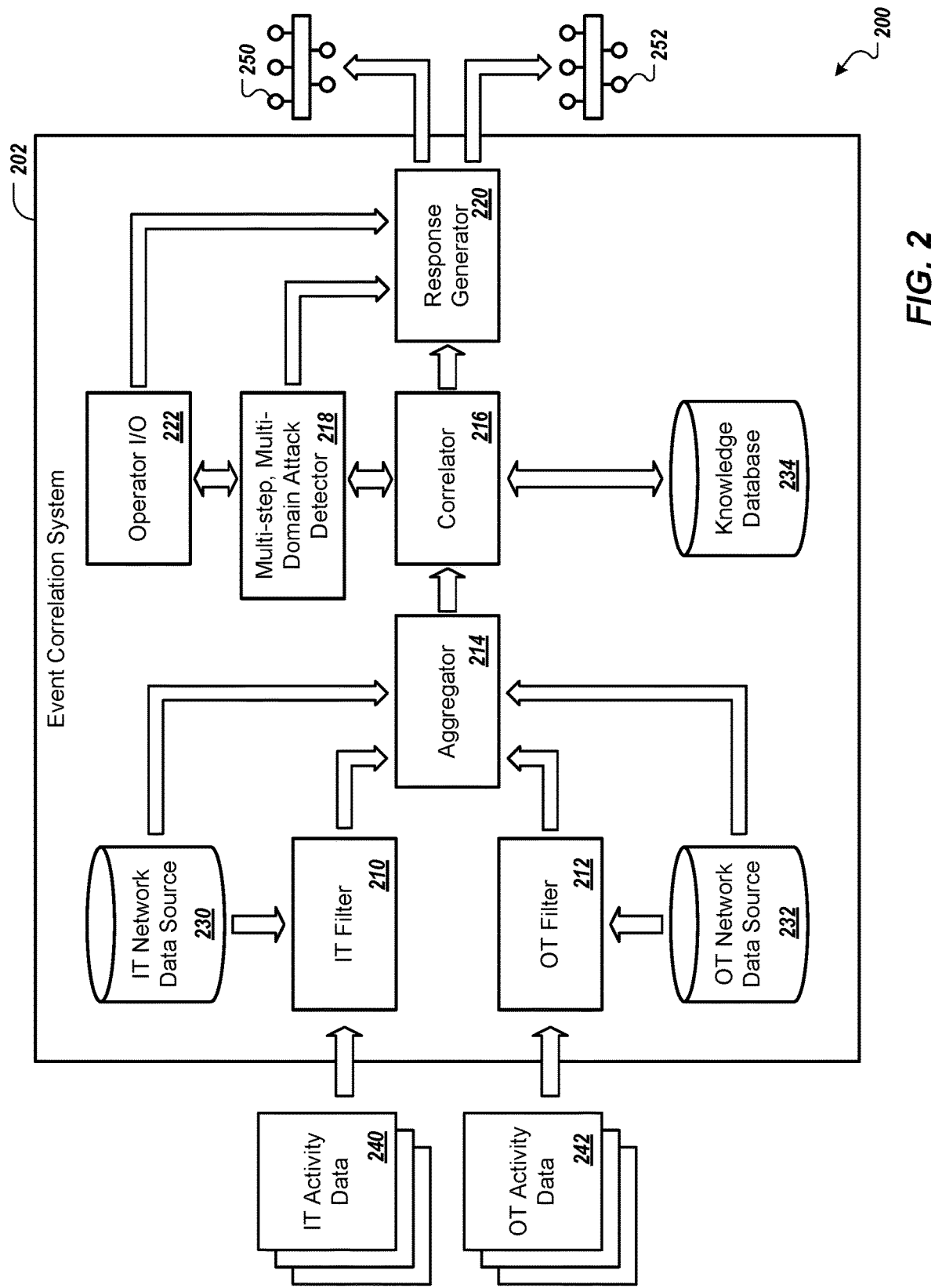

FIG. 2 depicts an example system 200 that can execute implementations of the present disclosure. In the present example, the system 200 includes an event correlation system 202 (e.g., similar to the event correlation system 150, shown in FIG. 1). The event correlation system 202, for example, can include various hardware and/or software-based components (e.g., software modules, objects, engines, libraries, etc.) including an information technology (IT) activity data filter 210, an operational technology (OT) activity data filter 212, an aggregator 214, a correlator 216, a multi-step, multi-domain attack detector 218, a response generator 220, and an operator input/output (I/O) component 222. Various data sources (e.g., databases, file systems, etc.) may maintain data used by the system 200 and its components. In the present example, the system 200 can receive information from an information technology (IT) network data source 230, an operational technology (OT) network data source 232, and a knowledge database (e.g., a threat intelligence data source) 234. Activity data associated with a demilitarized zone (DMZ) or peripheral network, for example, may be provided by the information technology network data source 230 and/or the operational technology network data source 232. In general, the system 200 and its various components (e.g., components 210, 212, 214, 216, 218, 220, and 222) can perform functions for processing event/alert data received from various sources, aggregating the data, correlating the data, detecting patterns in the data, and providing relevant information to system operators and/or other systems.

In the present example, the event correlation system 202 can receive information technology (IT) activity data 240 that includes event/alert data from an information technology network (e.g., the information technology (IT) network domain 102, and optionally the IT DMZ 106*a*, shown in FIG. 1), and can receive operational technology (OT) activity data 242 that includes event/alert data from an operational technology network (e.g., the operational technology (OT) network domain 104, and optionally the OT DMZ 106*b*, shown in FIG. 1). In some implementations, the information technology activity data 240 and/or the operational technology activity data 242 may include log data provided by one or more security sensors (e.g., the security sensors 108*a*, 108*b*, 108*c*, and 108*d*, shown in FIG. 1). Upon receiving the information technology activity data 240, for example, the event correlation system 202 can use the information technology activity data filter 210 to filter out irrelevant (or "false") events/alerts, based on data provided by the information technology network data source 230. False or irrelevant alerts may include errors generated by the security systems (e.g., an intrusion detection system, a firewall, etc.). In one example, a false or irrelevant alert is when the security systems perform anomalous behavior detection in which a tested for condition (e.g., rule based, specification based, or a combination of the two) is incorrectly found to have been detected. The detection is evaluated by, for example, human security experts and/or machine-learning systems designed to perform the evaluation, using domain security knowledge, attack mechanism, and information related to the system in question, such that the detection is found to be false or irrelevant. Similarly, upon receiving the operational technology activity data 242, for example, the event correlation system 202 can use the operational technology activity data filter 212 to filter out irrelevant (or "false") events/alerts, based on data provided by the operational technology network data source 232. Operation of the information technology activity data filter 210 and the operational technology activity data filter 212 is discussed in further detail below in association with FIG. 3.

After filtering the information technology activity data 240 and the operational technology activity data 242, for example, filtered event/alert data can be provided by the information technology activity data filter 210 and the operational technology activity data filter 212 to the aggregator 214. In general, the event correlation system 202 can use the aggregator 214 to remove duplicate and/or redundant events/alerts, to combine events/alerts related to the same attack, and to combine events/alerts relating to different attacks but possessing similar characteristics, thus reducing the number of events/alerts under consideration. In some implementations, the aggregator 214 may reference data provided by the information technology network data source 230 and/or the operational technology network data source 232 when performing aggregation operations. Operation of the aggregator 214 is discussed in further detail below in association with FIG. 4.

After aggregating the event/alert data, for example, aggregated data can be provided by the aggregator 214 to the correlator 216. In general, the event correlation system 202 can use the correlator 216 to enrich and correlate a chain of events/alerts that may correspond to a threat scenario. Correlator 216 is discussed in more detail with reference to alert correlator 502 in FIG. 5.

The event correlation system 202 can use the multi-step, multi-domain attack detector 218 (e.g., based on data provided by the knowledge database 234) to identify attack patterns associated with the threat scenario, and to further describe and/or enrich threat scenario information. Multi-step, multi-domain attack detector 218 is discussed in more detail with reference to multi-step, multi-domain attack detection system 700 in FIG. 7 below. Based on threat scenarios identified by the correlator 216 and attack patterns identified by the multi-step, multi-domain attack detector 218, and optionally based on operator input received by the operator input/output component 222, the response generator 220 can provide appropriate courses of action for responding to threats to the information technology network 250 and the operational technology network 252.

Figure 3:
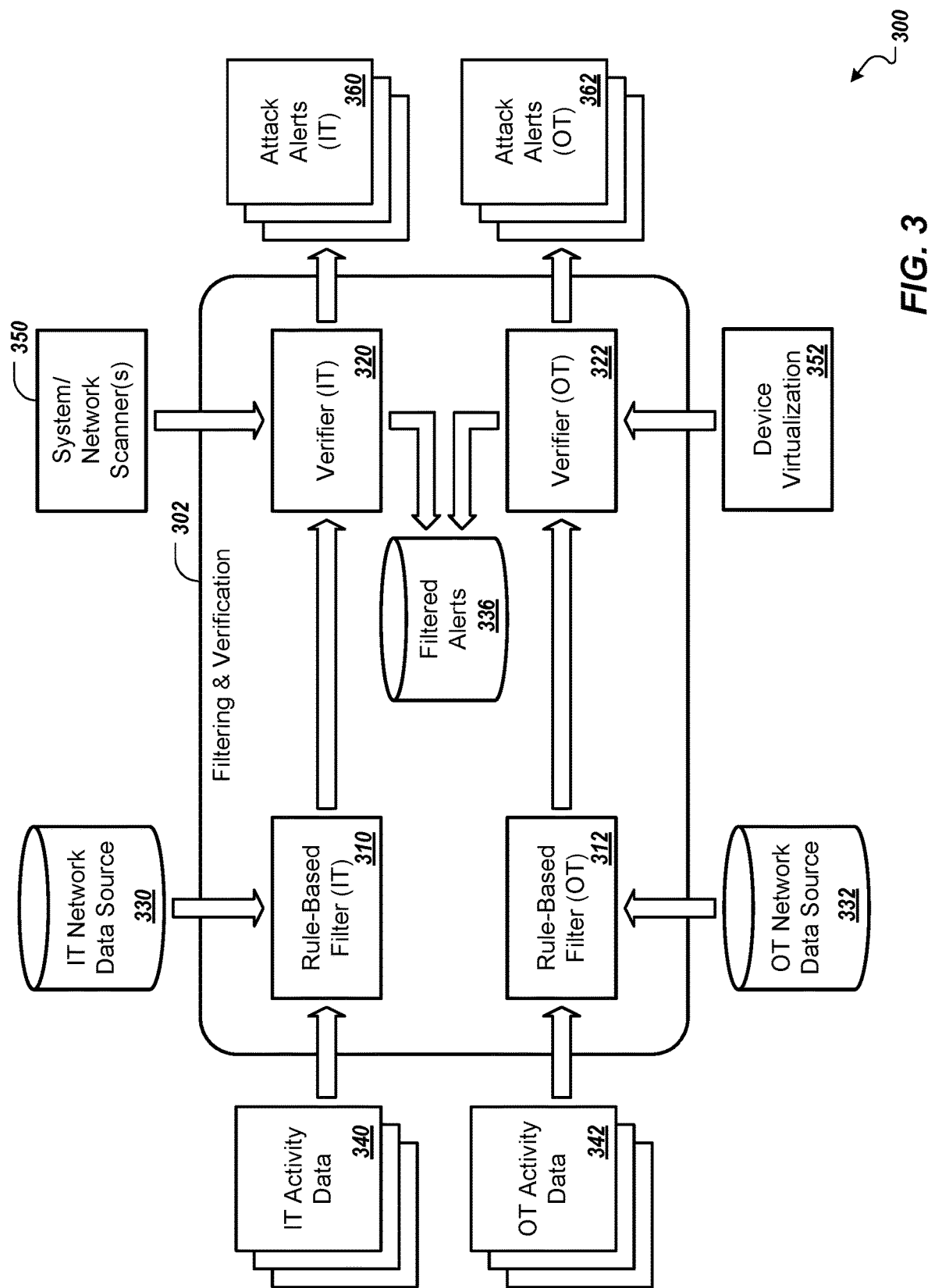

FIG. 3 depicts an example system 300 that can execute implementations of the present disclosure. In the present example, the system 300 includes a filtering and verification system 302 (e.g., corresponding to the information technology activity data filter 210 and the operational technology activity data filter 212, shown in FIG. 2). The filtering and verification system 302, for example, can include various hardware and/or software-based components (e.g., software modules, objects, engines, libraries, etc.) including a rule-based filter 310 for information technology (IT) activity data, a rule-based filter 312 for operational technology (OT) activity data, an optional verifier 320 for information technology (IT) activity data, and an optional verifier 322 for operational technology (OT) activity data. Various data sources (e.g., databases, file systems, etc.) may maintain data used by the system 300 and its components. In the present example, the system 300 includes an information technology (IT) network data source 330 (e.g., including configuration management information associated with devices in the information technology (IT) network domain 102, shown in FIG. 1), an operational technology (OT) network data source 332 (e.g., including configuration management information associated with devices in the operational technology (OT) network domain 104, shown in FIG. 1), and a filtered alerts data source 336. In general, the system 300 and its various components (e.g., components 310, 312, 320, and 322) can perform functions for processing event/alert data received from various different sources. By removing or filtering out irrelevant event/alert data (i.e., false positives and/or noise), for example, the accuracy of correlation engines may be increased.

In the present example, the filtering and verification system 302 can receive information technology (IT) activity data 340 that includes event/alert data from an information technology network, and optionally, a corresponding DMZ (e.g., the information technology (IT) network domain 102 and the IT DMZ 106a, shown in FIG. 1), and can receive operational technology (OT) activity data 342 that includes event/alert data from an operational technology network, and optionally, a corresponding DMZ (e.g., the operational technology (OT) network domain 104 and the DMZ 106b, shown in FIG. 1). In some implementations, the information technology activity data 340 and/or the operational technology activity data 342 may include log data provided by one or more security sensors (e.g., security sensors 108a, 108b, 108c, and 108d, shown in FIG. 1). For example, activity data received from multiple sources (e.g., multiple security sensors, intrusion detection systems, and/or other security tools) may be heterogeneous in regard to language, protocols, and standards. Such activity data may be heterogeneous, for example, not only because of different security tools in a single domain (which may be resolved through the use of alert/event standardization/normalization tools that convert data to a standard format), but because of different protocol standards which may be employed in multiple different domains by the same security tool. As another example, a standard format may be used for communicating activity data. Upon receiving the information technology activity data 340, for example, the filtering and verification system 302 can use the rule-based filter 310 for information technology activity data to filter out irrelevant (or "false") events/alerts, based on data provided by the information technology network data source 330 (e.g., similar to the information technology network data source 230, shown in FIG. 2), and in conjunction with additional rules that may be defined by system administrators. Similarly, upon receiving the operational technology activity data 342, for example, the filtering and verification system 302 can use the rule-based filter 312 for operational technology activity data to filter out irrelevant (or "false") events/alerts, based on data provided by the operational technology network database 332 (e.g., similar to the operational technology network data source 232, shown in FIG. 2), and in conjunction with additional rules that may be defined by system administrators.

In general, rule-based filtering performed by each of the rule-based filters 310 and 312 can remove irrelevant events/alerts (e.g., events/alerts that are not determined to be associated with a potential attack) based on a target's profile and/or characteristics of the events/alerts. Rule-based filtering, for example, may apply to defined rules that discard particular events/alerts (e.g., false positives) based on how frequently events/alerts with certain characteristics occur, and their relative rate of change with regard to occurrence. Profile data for potential targets (e.g., computing devices) in the information technology network domain 102 (shown in FIG. 1) can be maintained by the information technology network data source 330, and profile data for potential targets (e.g., computing devices, controllers, and sensors) in the operational technology network domain 104 (shown in FIG. 1) can be maintained by the operational technology network data source 332. For each received event/alert, for example, an appropriate rule-based filter may reference profile data from an appropriate network data source for a target that corresponds to the event/alert (e.g., based on device address), and can determine whether the received event/alert indicates a potential attack. For example, a network-based intrusion detection system may not have specific information about an attacker or about a target, but may generate an alert based on the contents of a communications packet—that is, the alert may be generated if the packet includes an exploit directed to a known vulnerability. However, the generated alert in the present example may or may not indicate a successful attack on the target. For example, if an attack relies on certain system attributes (e.g., a type of operating system), but the system has different attributes (e.g., a different operating system) that are not affected by an attempted attack, the attack is rendered unsuccessful. As another example, if a communications packet is directed to a computing device that does not exist on a network, the network drops the communications packet, rendering the packet ineffective and the attack unsuccessful. By filtering events/alerts associated with attack attempts that are likely to be unsuccessful, reconnaissance attempts (intentional or unintentional), and/or internal activity known to be benign, for example, the number of events/alerts under consideration may be reduced, thus reducing the amount of processing in subsequent stages.

In some implementations, profile data and/or statuses of potential targets (e.g., computing devices) may be dynamically determined when filtering received events/alerts. For example, after performing rule-based filtering on the information technology activity data 340, the filtering and verification system 302 can optionally use the verifier 320 to dynamically verify profile data for a target on the information technology network domain 102 (shown in FIG. 1), and the filtering and verification system 302 can optionally use the verifier 322 to dynamically verify profile data for a target on the operational technology network domain 104 (shown in FIG. 1). For each received event/alert that has not been previously filtered, for example, an appropriate verifier can determine whether dynamically retrieved information regarding a target corresponding to the event/alert (e.g., based on device address) indicates that the event/alert is associated with actual malicious activity. For example, for an unfiltered event/alert corresponding to a target on the information technology network domain 102, the verifier 320 can communicate with a system/network scanner 350 (e.g., with access to configuration management information) to receive current information about the target. In the present example, a communications packet may be directed to an open port on the target, and the rule-based filter 310 may not filter the corresponding alert. However, based on information provided by the system/network scanner 350, the verifier 320 may determine that the target has been patched to counter an attack associated with the alert, for example, rendering the communications packet ineffective and the attack unsuccessful. In the present example, the alert may be filtered out and/or labeled as a potentially unsuccessful attack. As another example, for an unfiltered event/alert corresponding to a target on the operational technology network domain 104, the verifier 322 can communicate with a device virtualization component 352 to receive current information about the target. In the present example, a communications packet may be directed to changing a setting (e.g., a temperature setting, an on/off setting, a power level, a position, etc.) on the target (e.g., a controller device). The device virtualization component 352, for example, can query the target (or one or more sensors associated with the target) for its status to determine an effect of the communications packet. A negative effect, for example, may indicate a potentially successful attack, whereas a neutral effect or lack of an effect may indicate a potentially unsuccessful attack.

After performing rule-based filtering and verification, for example, the filtering and verification system 302 can record filtered alert data associated with potentially unsuccessful attacks and/or false positives (e.g., in the filtered alerts data source 336), and can provide data associated with potential attacks for further processing. For example, the alerts 360 may be indicative of potential attacks on an information technology network (e.g., the information technology network domain 102, shown in FIG. 1) and the alerts 362 may be indicative of potential attacks on an operational technology network (e.g., the operational technology network domain 104, shown in FIG. 1). Data maintained by the filtered alerts data source 336, for example, may be used for generating future security policies.

Figure 4:
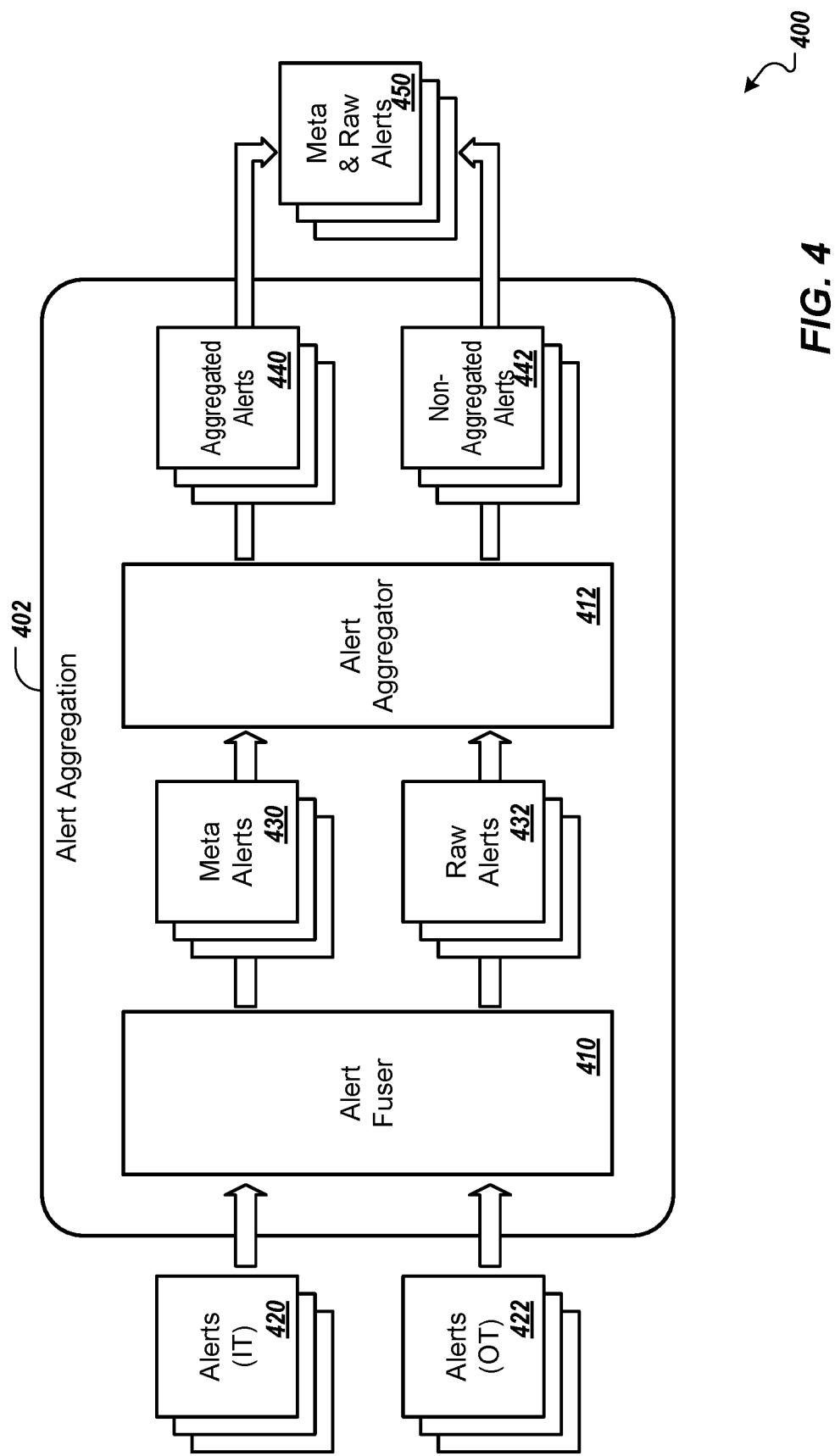
FIG. 4 depicts an example system that can execute implementations of the present disclosure.

FIG. 4 depicts an example system 400 that can execute implementations of the present disclosure. In the present example, the system 400 includes an alert aggregation system 402 (e.g., corresponding to the aggregator 214, shown in FIG. 2). The alert aggregation system 402, for example, can include various hardware and/or software-based components (e.g., software modules, objections, engines, libraries, etc.) including an alert fuser 410 and an alert aggregator 412. In general, the system 400 and its various components (e.g., components 410 and 412) can perform functions for processing and aggregating event/alert data received from various different sources. By aggregating event/alert data, for example, data redundancy can be decreased, and the aggregated event/alert data may be further processed to identify trends and correlations in the data.

In the present example, the aggregation system 402 can receive alert data 420 corresponding to potential attacks on an information technology network (e.g., the information technology network domain 102, shown in FIG. 1) and alert data 422 corresponding to potential attacks on an operational technology network (e.g., the operational technology network domain 104, shown in FIG. 1). Upon receiving the alert data 420 and the alert data 422, for example, the aggregation system 402 can use the fuser 410 to combine similar alerts, which may have been generated by different intrusion detection systems, security tools and/or sensors. For example, if multiple intrusion detection systems are included in the system 100, a malicious packet may be detected by each of the intrusion detection systems, and each of the systems may generate a similar alert in response to detecting the packet. In the present example, each of the similar alerts may include similar data, yet may have slightly different timestamps (e.g., due to network traffic speeds). If the fuser 410 determines that multiple alerts are related (e.g., the alerts were generated in response to the same packet or event based on having similar data and having timestamps within a threshold similarity value), for example, the multiple alerts may be combined into a meta-alert. The fuser 410 can provide meta-alerts 430 and raw alerts 432 (i.e., uncombined alerts) to the alert aggregator 412.

Upon receiving the meta-alerts 430 and raw alerts 432 from the alert fuser 410, for example, the alert aggregator 412 can aggregate the sets of alerts 430 and 432, based on data similarities. In general, alert aggregation may include combining alerts that have similar characteristics, which may indicate launch from and/or targeting of one or more computing devices. For example, an attack may include the scanning of particular computing devices included in an information technology network and computing devices included in an operational technology network, by multiple attackers. In the present example, alerts from the information technology network and alerts from the operational technology network may be aggregated to reflect that the alerts are associated with the same type of attack.

In some implementations, each of the sets of alerts 430 and 432 may have similar data formats (e.g., an intrusion detection message exchange format (IDMEF)), and may include data fields for source address, destination address, port number, timestamp, priority, and attack description. If the alert aggregator 412 determines that two or more of the meta-alerts 430 and/or the raw alerts 432 are similar based on criteria that pertains to data included in each alert (e.g., two or more alerts have the same destination address (and optionally, port number) and have timestamps within a threshold similarity value, two or more alerts have the same source address and have timestamps within a threshold similarity value, two or more alerts are targeted to similar services, or another suitable criteria based on similarity of alert attributes), for example, the alert aggregator 412 may aggregate the alerts. While the description above with regard to two or more of the meta-alerts 430 or raw alerts 432 being similar based on criteria that pertains to data included in each alert (and then being aggregated), it should be understood that the alert aggregator 412 may determine that a large or very large number of alerts are related (e.g. hundreds, thousands, or more alerts) and aggregate those alerts into a single record or data structure that facilitates efficient processing of a large volume of alert data. The alert aggregation system 402 can provide aggregated alerts 440 and non-aggregated alerts 442 as a combined set of meta and raw alerts 450 for further processing, as discussed in further detail with reference to FIG. 5.

Figure 5:
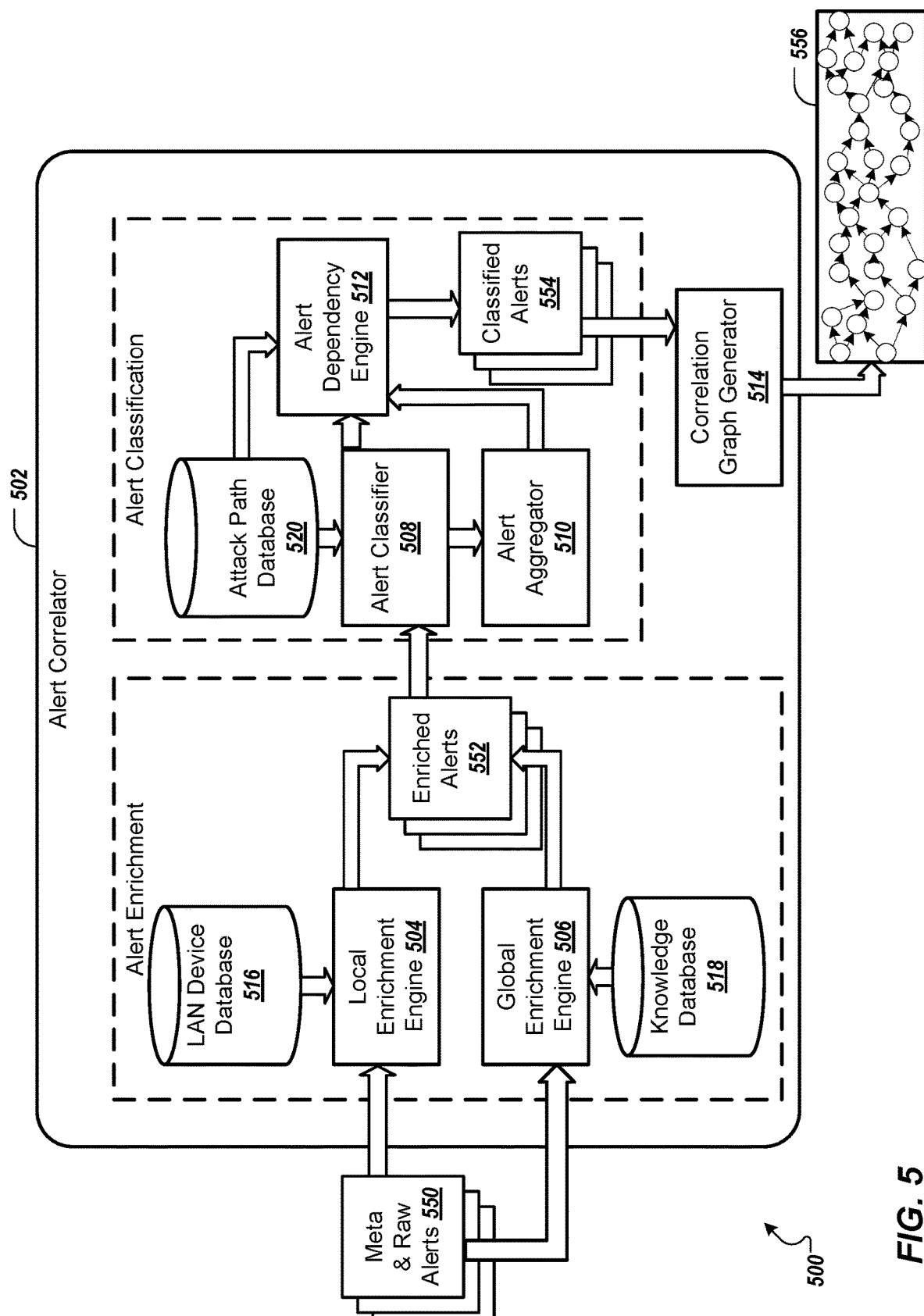
FIG. 5 depicts an example system that can execute implementations of the present disclosure.

FIG. 5 depicts an example system 500 that can execute implementations of the present disclosure. In the present example, the system 500 includes an alert correlator 502 (e.g., similar to correlator 216 discussed with reference to FIG. 2), which can include two sub-modules for alert enrichment and alert correlation. The alert correlator 502 can include various hardware and/or software-based components (e.g., software modules, objects, engines, libraries, etc.) including a local enrichment engine 504, global enrichment engine 506, alert classifier 508, alert aggregator 510, alert dependency engine 512, correlation graph generator 514. Various data sources (e.g., databases, file systems, etc.) may maintain data used by the system 500 and its components. In the present example, the system 500 includes a local area network (LAN) device data source 516, a knowledge database 518 (e.g., similar to the knowledge database 234, shown in FIG. 2), and an attack path data source 520. In general, the system 500 and its various components (e.g., components 504, 506, 508, 510, 512, 514) can perform functions for enriching and classifying aggregated alert data. By enriching and classifying aggregated alert data, for example, complex multi-step attacks against an entire industrial control system network (e.g., including information technology and operational technology network domains) may be detected.

In the present example, the alert correlator 502 can receive raw alerts and meta alerts 550, for example, the meta and raw alerts 450 from the alert aggregation system 402 (shown in FIG. 4). The meta and raw alerts 550, for example, may include aggregated and non-aggregated alerts that are associated with suspicious network activity from multiple different network domains (e.g., the industrial technology (IT) network domain 102, the IT DMZ 106a, the operational technology (OT) network domain 104, and the OT DMZ 106b, shown in FIG. 1). The meta and raw alerts 550 may be provided to the alert correlator 502 by one or more sources, for example, by a Security Information and Event Management (SIEM) system.

Upon receiving the meta and raw alerts 550, for example, the alert correlator 502 can provide the raw alert data 550 to the local enrichment engine 504 and the global enrichment engine 506. In some implementations, local enrichment engine 504 may use one or more surveying processes to sample local devices and/or operations of the IT network domain and OT network domain to enhance the raw alerts 550. In one example, open-source or commercially-available tools may be used that listen to network traffic in the ICS network and analyze it (e.g., reverse engineer the network traffic) to discover all assets (e.g., IT and/or OT network devices) and determine the firmware, operating systems, and services of each asset. In another example, enrichment agents may be installed on each asset, where the enrichment agents collect system information. Data collected from the respective assets can be stored in, for example, the IT network data source 330 and OT network data source 332. The surveying process can then include accessing the stored collected data from the IT network data source 330 and OT network data source 332.

The local alert enrichment engine 504 may compare the raw alert data 550 to a local database 516 of local area network (LAN) devices and device operation, and append information gathered from local devices (e.g., local devices 122, 124, 126, 128, and 130, shown in FIG. 1) to a particular meta/raw alert 550.

For example, a particular raw alert may be received by the alert correlator 502 and processed by the local enrichment engine 504. The local enrichment engine 504 may survey one or more targets devices in the IT network domain and/or OT network domain to gather additional information related to the raw alert (e.g., particulars relating to a possible attack on the targeted device, status updates and/or operational details from the targeted devices, etc.). The local enrichment engine 504 may then append the complementary information gathered by the local enrichment engine 504 to the particular raw alert 550 to generate an enriched alert 552.

In some implementations, the local enrichment engine 504 can proactively survey the local area network of devices (e.g., with specific probing packets using transmission control protocol (TCP), user datagram protocol (UDP), internet control message protocol (ICMP), or another similar protocol) to gather potentially relevant information for enriching one or more alerts, and may store the relevant information in a LAN device database 516, for example, as stored network topology data. The local enrichment engine 504 may instead/additionally survey the local area network of devices reactively, where the survey for enrichment data from the local area network of devices occurs responsive to one or more raw alerts provided to the alert correlator 502 (e.g., by a Security Information and Event Management (SIEM) system).

In some implementations, global enrichment engine 506 may access threat intelligence data from one or more threat knowledge databases 518 to enhance the raw alert data 550. Knowledge database 518 may include a threat intelligence database (e.g., a global threat database), and/or other global data (e.g., threat intelligence sources, vulnerability and incident repositories, or other sources of security information not owned by the local network) related to the particular ICS network that is under attack. Threat intelligence databases may include, for example, iDefense, Common Attack Pattern Enumeration and Classification (CAPEC), Common Vulnerabilities and Exposures (CVE), and/or National Vulnerabilities Database (NVD). For example, the global enrichment engine 506 may access an application program interface (e.g., iDefense by Accenture) to gather information related to the raw/meta alert 550.

The enriched alert 552 is processed by an alert classifier 508. The alert classifier 508 can classify the enriched alert 552 as indicative of one or more steps of a IT cyber kill chain (IT CKC) and/or ICS cyber kill chain (ICS CKC) in part, by using attack path database 520. Attack path database 520 can include all possible attack paths for the particular ICS network (or more generically, an industrial Internet-of-things (IIOT network). In general, identifying an attack path may include determining a series of communications between computing devices. For example, an attacker may attempt to change the status of a controller device in an operational technology (OT) network, but lack physical access. In the present example, to gain access to the controller device, the attacker may launch an attack against a computer device in an information technology (IT) network, and may exploit the computer device in order to step to a human-machine interface (HMI) device in the operational technology network, and then may further exploit the human-machine interface device in order to step to the controller device. The attack path database 520 can include multiple known attack paths or attack trees, where each attack path represents the potential paths an adversary can take to get into different targets (e.g., assets in the IT network domain 102 and/or assets in the OT network domain 104) in the IIOT network.

Attack path database 520 may additionally include a look-up table mapping each possible alert (e.g., as determined for the particular IIOT network) to one or more steps of the IT CKC and/or ICS CKC process. The look-up table may include keywords for the IT CKC and ICS CKC that can be matched to keywords extracted from the alert, such that each alert can be classified as indicative of a step in a IT CKC/ICS CKC process and each enriched alert 552 is labeled as a classified alert 554. In some implementations, the look-up table may be generated by a human expert analyzing the particular IIOT network.

Figure 6:
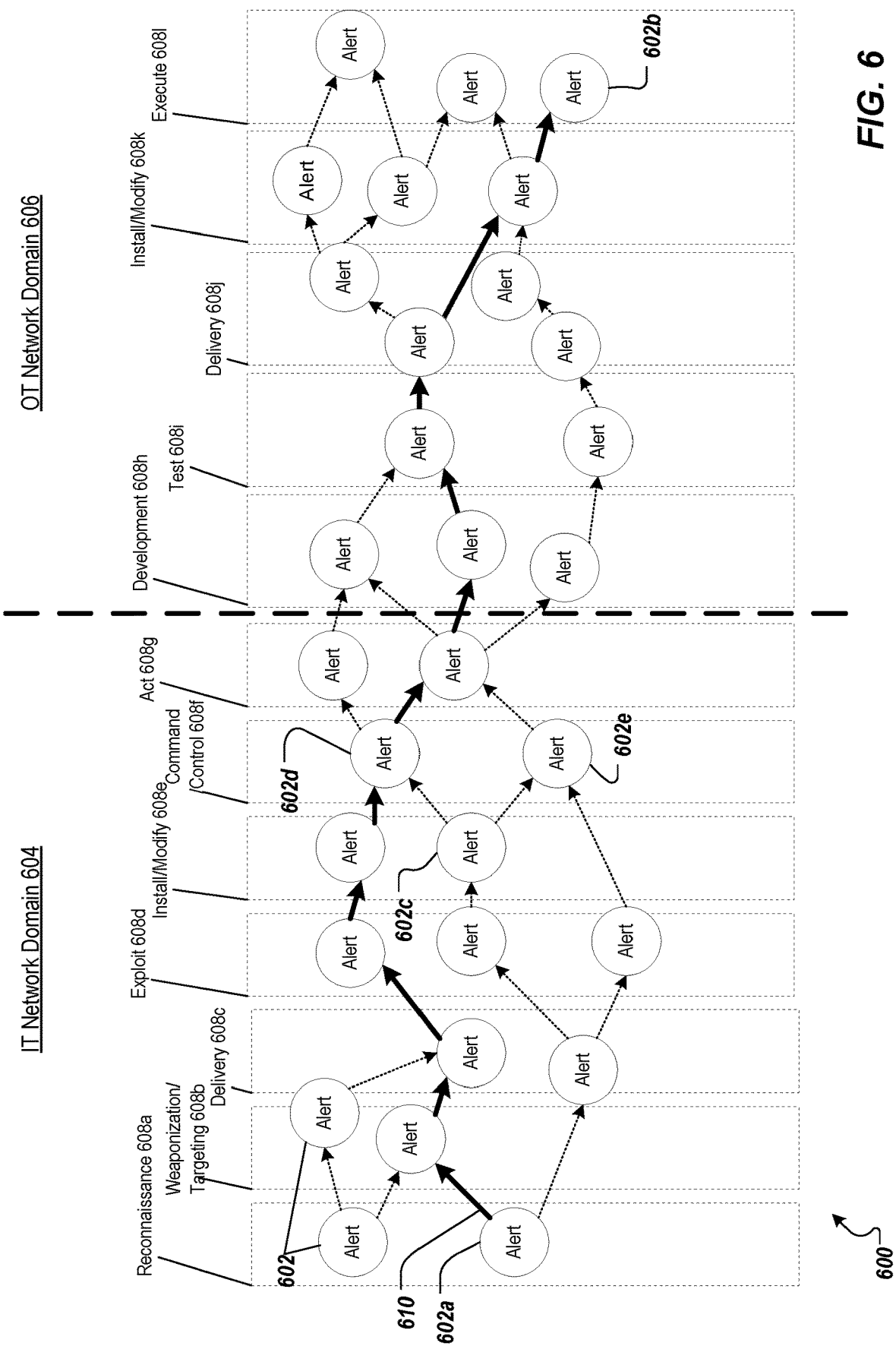
FIG. 6 depicts an example visualization of a correlation graph that can be used by implementations of the present disclosure.

In some implementations, an IT CKC process may include the steps reconnaissance, weaponization, delivery, exploit, install/modify, command and control, act. The ICS CKC may further include the additional steps: development, test, delivery, install/modify, and execute. Each step of the IT CKC and ICS CKC can be associated with particular characteristics relating to a stage in an attack path taken by an adversary, for example, by using feature ranking. Feature ranking can use machine-learning to extract features (e.g., keywords) from an alert and match them to known features for different steps of the IT CKC and/or ICS CKC to determine to which step in the IT CKC/ICS CKC the alert belongs. The steps of the IT CKC/ICS CKC processes may be divided into steps corresponding to IT network domain and steps corresponding to OT network domain. For example, steps corresponding to the IT network may be defined by an IT CKC, while steps corresponding to the OT network may be defined by ICS CKC, (e.g., as depicted in FIG. 6). In some implementations, the ICS CKC steps for the OT network domain are defined based on the Purdue Model.

The enriched alert 552 can be labeled by the alert classifier 508 as a particular step in the IT CKC process and/or ICS CKC process. In some implementations, the alert classifier 508 may include a human operator to provide expert labeling of each enriched alert 552 with the particular step in the CKC process. Expert labeling by the human operator of a set of enriched alerts 552 may be provided to the machine-learning algorithms as a training set. For example, the training set of expert-labeled enriched alerts 552 can be used to generate one or more machine-learning classifiers for the alert classifier 508 for automatically labeling an enriched alert 552 with a particular step in the CKC process as a classified alert 554.

In some implementations, the alert classifier 508 can process the enriched alert 552 using one or more machine-learning algorithms to determine the particular step in the IT CKC and/or ICS CKC for the enriched alert 552. The determination of the particular step may include an analysis comparing the enriched alert 552 to a previously labeled/classified set of alerts that have similar characteristics. The machine-learning process may determine alert labels using, for example, feature ranking and/or protocol extraction.

In some implementations, an alert may be classified by the alert classifier 508 as indicative of two or more steps in the IT CKC and/or ICS CKC, for example an alert may be classified as having characteristics pertaining to both "act" and "development." In such cases, the alert may have characteristics pertaining to two or more steps, where the alert classification may include a fractional classification (e.g., the alert is determined to be 75% "act" and 25% "development").

In some implementations, an alert aggregator 510 can group together multiple classified 554 alerts based on the classification of each alert with respect to a step in the IT CKC and/or ICS CKC. The grouping of the multiple classified alerts 554 can be based in part on a same classification assigned to each classified alert of the multiple alerts. In one example, a reconnaissance attack may generate thousands of alerts, which can then be classified individually as indicative of a "reconnaissance" step in the CKC. The alert aggregator 510 can then group the set of reconnaissance alerts into a meta-alert labeled "reconnaissance."

In some implementations, alert aggregator 510 is similar to alert aggregator 412. In another embodiment, alert aggregator 412 groups alert based on similar characteristics of the alerts, which may indicate launch from and/or targeting of one or more computing devices, whereas the alert aggregator 510 groups together alerts based on their respective classification as one or more steps in the IT CKC and/or ICS CKC.

The alert dependency engine 512 identifies one or more dependencies for the classified alert 554. For example, for a classified alert 554, enrichment information from a threat intelligence data (e.g., from knowledge database 518) added by the global enrichment engine 506 and potential attack paths defined by an attack graph generated for the IIOT network from the attack graph database 520 can be used to identify all potential consequences (e.g., a list of exploits or other potential adversarial actions). The one or more attack paths in the attack path database 520 describes how one vulnerability may relate to another. In some implementations, an alert can be associated with a specific vulnerability and the attack graph can be used to establish the dependency between alerts.

In some implementations, a dependency is established between a pair of classified alerts 554, where the dependency is a relationship (e.g., Alert A is a prerequisite alert to Alert B, or Alert A is a consequence of Alert B) between the pair of classified alerts 554.

A prerequisite alert for a particular classified alert is an alert that is (i) classified as a preceding step in the CKC process and (ii) precedes the particular classified alert in a known attack path. For example, a prerequisite alert for a particular alert classified as a "command and control" alert would be an alert classified as a "act" alert, according to one CKC process (e.g., as depicted in FIG. 6). A consequence alert for the particular classified alert is an alert that is (i) classified as a subsequent step in the CKC and (ii) follows the particular classified alert in a known attack path. For example, a consequence alert for a particular alert classified as an "exploit" alert would require a classification of "install/modify" according to one CKC process (e.g., as depicted in FIG. 6). In some implementations, each classified alert 554 includes at least one prerequisite alert and at least one consequence alert. A classified alert 554 may have multiple dependencies, where the alert 554 may have multiple prerequisites (e.g., multiple alerts precede the particular alert) and/or may have multiple consequences (e.g., multiple alerts can follow the particular alert).

In some implementations, one or more of the dependencies for the classified alert 554 may be determined based in part on one or more of the following: the step of the CKC process of the classified alert 554, the local enrichment data for the alert, and/or the global enrichment data for the alert. The one or more dependencies for the classified alert 554 can also be determined by analyzing the impact of an attack (e.g., in a post-mortem analysis) where the impact may include potential gains for an adversary who conducted the attack (e.g., what additional vulnerabilities in the IT/OT networks may have been exposed through the attack). For example, an IIS buffer overflow attack exposes a further buffer overflow vulnerability which can be used to gain certain administrative privileges.

In some implementations, one or more dependencies for the classified alert may be determined by a time-based threshold. For example, the alert dependency engine 512 may determine a dependency between two or more classified alerts 554 if the alerts have timestamps within a suitable time threshold value (e.g., one minute, five minutes, ten minutes, or another suitable value). The time threshold value, for example, may be a configurable tuning parameter. In some implementations determining dependencies for classified alerts 554 may depend on a class of a particular alert (e.g., a type of attack for the alert and/or the step in the CKC process).

In some implementations, the alert dependency engine 512 can identify classified alerts 554 having identical classifications, prerequisites, and consequences, and can correlate the identified classified alerts having identical classifications, perquisites, and consequences. In some implementations, the alert dependency engine 512 may also merge or otherwise combine the duplicate alerts, to remove redundancy of classified alerts.

Correlation graph generator 514 aggregates classified alerts each with respective identified dependencies and generates an adversary prediction model (e.g., correlation graph 556), described below in more detail with reference to FIG. 6. The correlation graph generator 514 can model each classified alert 554 including at least one dependency (e.g., a prerequisite alert and/or a consequence alert for the alert), where each classified alert is a node in the correlation graph 556, and each edge in the correlation graph 556 is a dependency (e.g., a prerequisite dependency or a consequence dependency) of the alert to either a prerequisite alert or a consequence alert. In some implementations, the correlation graph generator 514 uses fuzzy-matching or other techniques including probabilistic correlation, attack graph matching, formal methods, state machine, and logic-based models to analyze the classified alert data 554 and build the correlation graph 556.

FIG. 6 depicts an example data structure (e.g., a correlation graph 556) than can be used by implementations of the present disclosure. Correlation graph 600 (e.g., similar to the correlation graph 556 described in FIG. 5) is a visualization of a particular set of classified alerts 602 arranged according to the steps of a particular combined IT cyber kill chain (IT CKC) and ICS CKC process. The IT CKC/ICS CKC process includes IT network domain steps 604 and OT network domains steps 606. In the example of correlation graph 600, the IT network domain steps of the CKC process 604 include reconnaissance 608a, weaponization/targeting 608b, delivery 608c, exploit 608d, install/modify 608e, command/control 608f, and act 608g. The OT network domain steps of the CKC process 606 include development 608h, test 608i, delivery 608j, install/modify 608k, and execute 608l. Each of the steps 608 of the IT CKC/ICS CKC process defined in correlation graph 600 includes one or more alerts 602.

In some implementations, an attack path 610 can be identified where the attack path 610 includes one alert for each step in the defined IT CKC/ICS CKC, such that the attack path begins with a first step in the CKC (e.g., reconnaissance 608a) and ends with a final step in the ICS CKC (e.g., execute 608l). For example, alert 602a is a first "reconnaissance" step in the CKC depicted in the correlation graph 600, and alert 602b is a final "execute" step in the ICS CKC following attack path 610.

Correlation graph 600 can be used by the system to predict attack patterns and perform extraction of identified threats, e.g., for threat-hunting or adversary prediction, as described in more detail with reference to FIG. 7.

Figure 7:
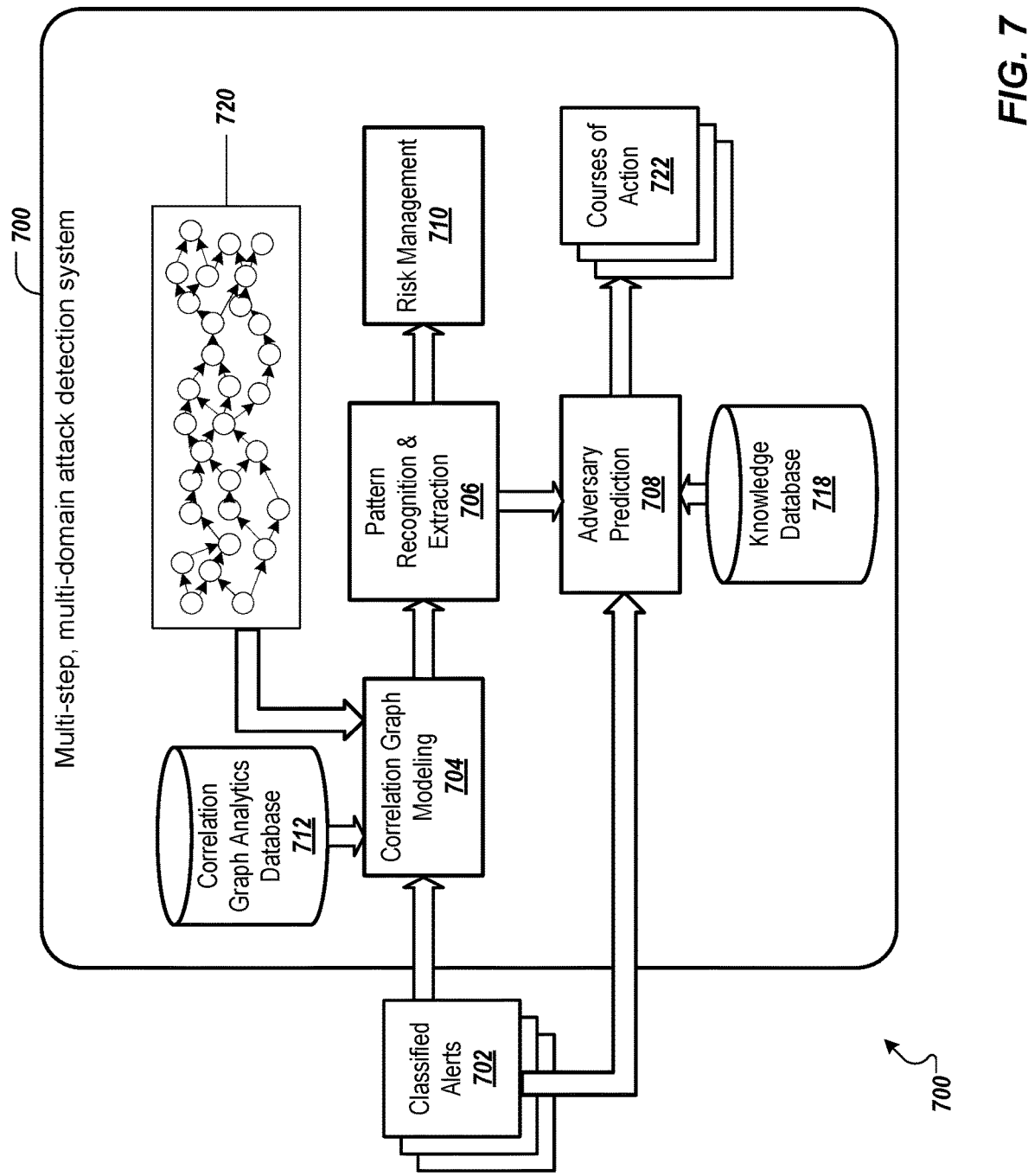
FIG. 7 depicts an example system that can execute implementations of the present disclosure.

FIG. 7 depicts an example system that can execute implementations of the present disclosure. A multi-step, multi-domain attack detection system 700 (e.g., similar to the multi-step, multi-domain attack detector 218 described with reference to FIG. 2) includes components, modules, and/or engine, for example, a correlation graph modeling engine 704, a pattern recognition and extraction engine 706, an adversary prediction engine 708, and a risk management engine 710. Additionally, the multi-step, multi-domain attack detection system 700 can include one or more sources of data, for example, a correlation graph analytics database 712 and/or a knowledge database 718 (e.g., similar to the knowledge database 518 in FIG. 5). In some implementations, the multi-step, multi-domain attack detection system 700 is an advanced persistent threat (APT) detection system. The multi-step, multi-domain attack detection system 700 can receive classified alerts 702 (e.g., classified alerts 554 from the alert correlator 502) and process the alerts 702 to perform threat-hunting and take counter-measures (e.g., risk management 710 and/or courses of action 722). With reference to FIG. 2, the multi-step, multi-domain attack detection system 700 (e.g., multi-step, multi-domain attack detector 218) receives classified alerts from alert correlator 502 (e.g., correlator 216), and generates risk management 710 and/or courses of action 722 (e.g., response generator 220) to provide back to the IIOT network.

In some implementations, correlation graph analytics database 712 for a generated correlation graph 720 (e.g., similar to correlation graph 600 in FIG. 6) can be provided by the correlation graph modeling engine 704 to the pattern recognition and extraction module 706. The correlation graph analytics database 712 can include patterns of previously seen/detected/identified complex ICS threats, for example, Stuxnet, Night Dragon, CrashOverride, and the like. A particular alert 702 received by the multi-step, multi-domain attack detection system 700 would then trigger a prediction one or more subsequent (e.g., consequence) steps that an adversary will take in the IT CKC/ICS CKC process. For example, the multi-step, multi-domain attack detection system 700 may receive an alert 702 (e.g., alert 602c classified as an "install/modify" alert for correlation graph 600), which has been mapped to two consequence alerts in the correlation graph 720 (e.g., 602d and 602e in the "command/control" step of the IT CKC/ICS CKC in the correlation graph 600). Adversary prediction engine 708 may determine one or more likely outcomes for the alert 702 and recommend one or more courses of action 722 for the IT/OT network under attack. The multi-step, multi-domain attack detection system 700 may then implement one or more courses of action 722 to block the subsequent step in anticipation of the attack. Examples of counter-attack strategies include blocking, patching and updating, access control updates, white listing, physical security, or a combination thereof.

In some implementations, the risk management engine 710 may provide information to a user (e.g., a network administrator) to assist in installing new software or software patches within a system, based on identified risks provided by the pattern recognition and extraction engine 706.

Figure 8:
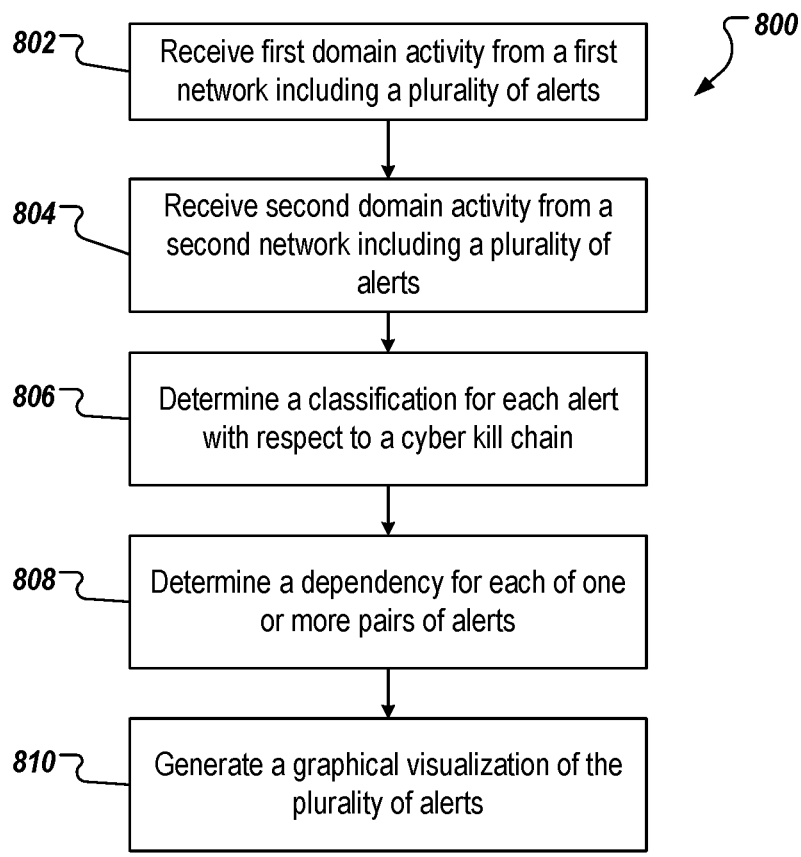
FIG. 8 is a flowchart of an example process that can be executed in accordance with implementations of the present disclosure.

FIG. 8 is a flowchart of an example process 800 that can be executed in accordance with implementations of the present disclosure. The process 800, for example, can be performed by systems such as one or more of the example systems described above. Briefly, the example process 800 includes receiving domain activity data from a first network domain (e.g., an IT network domain) and a second network domain (e.g., an OT network domain), where the domain activity data includes multiple alerts from each network domain, and then classifying each alert of the multiple alerts with respect to a cyber kill chain and/or ICS CKC, determining a dependency for each alert and/or pairs of alerts, and generating a graphical visualization (e.g., a correlation graph 600) of the multiple alerts which can be used for pattern extraction and prediction in order to determine, for example, counter-measure strategies.

Domain activity data is received from a first network domain (e.g., an IT network domain) including multiple alerts (802). Referring to FIGS. 1 and 2 as discussed above, for example, activity data (e.g., event/alert data provided by one or more intrusion detection systems) can be received by an event correlation system (e.g., event correlation system 150).

Domain activity data is received from a second network domain (e.g., an OT network domain) including multiple alerts (804). Referring to FIGS. 1 and 2 as discussed above, for example, activity data (e.g., event/alert data provided by one or more intrusion detection systems) can be received by an event correlation system (e.g., event correlation system 150).

In some implementations, the multiple alerts (e.g., IT alerts 420 and OT alerts 422) received from the respective network domains can be aggregated (e.g., by alert aggregation 402) as meta and raw alerts 450 and provided to the alert correlator (e.g., alert correlator 502).

A classification for each alert of the multiple alerts is determined with respect to a cyber kill chain (e.g., an IT CKC and/or ICS CKC) (806). An alert classifier (e.g., alert classifier 508) can received multiple alerts (e.g., alerts 550 and/or enriched alerts 552) and determine a classification for each alert with respect to a step in a cyber kill chain process. In some implementations, the alert classifier receives enriched alerts 552 that have been appended with additional information by a local enrichment engine 504 (e.g., using LAN device data) and/or a global enrichment engine 506 (e.g., using knowledge data including threat intelligence data).

A dependency is determined for each of one or more pairs of alerts (808). Each alert includes at least one dependency on one other alert, where a dependency can include a prerequisite dependency (e.g., a preceding alert) between a pair of alerts, or a consequence dependency (e.g., a following alert) between a pair of alerts. A dependency relationship is established by an alert dependency engine 512 between pairs of classified alerts 554. In some implementations, a particular alert may include multiple dependencies, each dependency defining a relationship (e.g., an edge) to a different alert. For example, a particular alert may have multiple prerequisite dependencies (e.g., two or more prerequisite alerts that result in the particular alert), and multiple consequence dependencies (e.g., two or more consequence alerts that follow from the particular alert).

The dependency relationship between a first alert and a second, different alert (in other words, between a pair of alerts) may depend in part on the classification of the respective alerts. For example, an alert 602c classified as an "install/modify" alert is a prerequisite alert to an alert 602d classified as an "command/control" alert, and the alert 602d is a consequence alert to the alert 602c.

A graphical visualization (e.g., correlation graph 600) is generated for the multiple alerts (e.g., alerts 602) (810). The graphical visualization may arrange the multiple classified alerts according to the sequence of steps of the cyber kill chain, where each alert is a node and each dependency between the alerts is an edge.

Embodiments of the subject matter described in this specification can be implemented in a computing system that includes a back end component (e.g., as a data server), or that includes a middleware component (e.g., an application server), or that includes a front end component (e.g., a client computer) having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device) which acts as a client. Data generated at the user device (e.g., a result of the user interaction) can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for detecting and identifying advanced persistent threats (APTs) in networks, the method being executed by one or more processors and comprising:
   receiving first domain activity data from a first network domain and second domain activity data from a second network domain, the first domain activity data and the second domain activity data including a plurality of alerts from the respective first and second network domains, each alert of the plurality of alerts resulting from one or more detected events in the respective first or second network domains;
   determining, for each alert of the plurality of alerts, a respective classification of the alert with respect to a cyber kill chain;
   determining, a dependency for each of one or more pairs of alerts, wherein the dependency of each pair of alerts depends in part on the respective classifications of the alerts in the pair of alerts and wherein each dependency defines a relationship between the pair of alerts, wherein the relationship between the pair of alerts indicates that a classified alert includes at least one of a prerequisite alert and a consequence alert in an attack path, wherein the prerequisite alert is an alert classified as a preceding step that preceded the classified alert, the consequence alert is an alert classified as a subsequent step that follows the classified alert; and
   generating, from the plurality of alerts, a graphical visualization of the plurality of alerts, the graphical visualization comprising a plurality of nodes, and edges between nodes, each node corresponding to the cyber kill chain, and representing at least one classified alert, and each edge representing the dependency defining the relationship between the classified alerts.

2. The method of claim 1, wherein the dependency of the pair of alerts includes a prerequisite dependency or a consequence dependency between the pair of alerts.

3. The method of claim 1, wherein an alert of the plurality of alerts comprises a plurality of dependencies, each dependency of the plurality of dependencies defining a relationship to a different alert of the plurality of alerts.

4. The method of claim 1, wherein classifying the alert with respect to the cyber kill chain comprises classifying the alert as indicative of one or more steps of an IT cyber kill chain and/or an ICS cyber kill chain.

5. The method of claim 4, wherein classifying the alert with respect to the cyber kill chain comprises utilizing an attack path database.

6. The method of claim 1, wherein generating the graphical visualization of the plurality of alerts further comprises generating an adversary prediction model, wherein for at least one alert of the plurality of alerts a prediction is made of one or more steps that an adversary may take based at least in part on the graphical visualization.

7. The method of claim 1, wherein determining the dependency for each of one or more pairs of alerts comprises determining that a first timestamp for a first alert of the one or more pairs of alerts and a second timestamp for a second alert of the one or more pairs of alerts are within a time threshold value.

8. The method of claim 1, wherein determining, for each alert of the plurality of alerts, the classification of the alert with respect to the cyber kill chain comprises:
   receiving enriched alerts appended with additional information from one or more of local devices and threat intelligence data from a threat knowledge database; and
   classifying the alert based in part on the additional information.

9. A system comprising:
   one or more processors; and
   a computer-readable storage device coupled to the one or more processors and having instructions stored thereon which, when executed by the one or more processors, cause the one or more processors to perform operations for detecting advanced persistent threats (APTs) in networks, the operations comprising:
   receiving first domain activity data from a first network domain and second domain activity data from a second network domain, the first domain activity data and the second domain activity data including a plurality of alerts from the respective first and second network domains, each alert of the plurality of alerts resulting from one or more detected events in the respective first or second network domains;
   determining, for each alert of the plurality of alerts, a respective classification of the alert with respect to a cyber kill chain;
   determining, a dependency for each of one or more pairs of alerts, wherein the dependency of each pair of alerts depends in part on the respective classifications of the alerts in the pair of alerts and wherein each dependency defines a relationship between the pair of alerts, wherein the relationship between the pair of alerts indicates that a classified alert includes at least one of a prerequisite alert and a consequence alert in an attack path, wherein the prerequisite alert is an alert classified as a preceding step that preceded the classified alert, the consequence alert is an alert classified as a subsequent step that follows the classified alert; and generating, from the plurality of alerts, a graphical visualization of the plurality of alerts, the graphical visualization comprising a plurality of nodes, and edges between nodes, each node corresponding to the cyber kill chain, and representing at least one classified alert, and each edge representing the dependency defining the relationship between the classified alerts.

10. The system of claim 9, wherein the dependency of the pair of alerts includes a prerequisite dependency or a consequence dependency between the pair of alerts.

11. The system of claim 9, wherein an alert of the plurality of alerts comprises a plurality of dependencies, each dependency of the plurality of dependencies defining a relationship to a different alert of the plurality of alerts.

12. The system of claim 9, wherein classifying the alert with respect to the cyber kill chain comprises classifying the alert as indicative of one or more steps of an IT cyber kill chain and/or an ICS cyber kill chain.

13. The system of claim 12, wherein classifying the alert with respect to the cyber kill chain comprises utilizing an attack path database.

14. The system of claim 9, wherein generating the graphical visualization of the plurality of alerts further comprises generating an adversary prediction model, wherein for at least one alert of the plurality of alerts a prediction is made of one or more steps that an adversary may take based at least in part on the graphical visualization.

15. The system of claim 9, wherein determining the dependency for each of one or more pairs of alerts comprises determining that a first timestamp for a first alert of the one or more pairs of alerts and a second timestamp for a second alert of the one or more pairs of alerts are within a time threshold value.

16. The system of claim 9, wherein determining, for each alert of the plurality of alerts, the classification of the alert with respect to the cyber kill chain comprises:

receiving enriched alerts appended with additional information from one or more of local devices and threat intelligence data from a threat knowledge database; and classifying the alert based in part on the additional information.

17. One or more non-transitory computer-readable storage media coupled to one or more processors and having instructions stored thereon which, when executed by the one or more processors, cause the one or more processors to perform operations for detecting advanced persistent threats (APTs) in networks, the operations comprising:

receiving first domain activity data from a first network domain and second domain activity data from a second network domain, the first domain activity data and the second domain activity data including a plurality of alerts from the respective first and second network domains, each alert of the plurality of alerts resulting from one or more detected events in the respective first or second network domains;

determining, for each alert of the plurality of alerts, a respective classification of the alert with respect to a cyber kill chain;

determining, a dependency for each of one or more pairs of alerts, wherein the dependency of each pair of alerts depends in part on the respective classifications of the alerts in the pair of alerts and wherein each dependency defines a relationship between the pair of alerts, wherein the relationship between the pair of alerts indicates that a classified alert includes at least one of a prerequisite alert and a consequence alert in an attack path, wherein the prerequisite alert is an alert classified as a preceding step that preceded the classified alert, the consequence alert is an alert classified as a subsequent step that follows the classified alert; and generating, from the plurality of alerts, a graphical visualization of the plurality of alerts, the graphical visualization comprising a plurality of nodes, and edges between nodes, each node corresponding to the cyber kill chain, and representing at least one classified alert, and each edge representing the dependency defining the relationship between the classified alerts.

18. The computer-readable storage media of claim 17, wherein the dependency of the pair of alerts includes a prerequisite dependency or a consequence dependency between the pair of alerts.

19. The computer-readable storage media of claim 17, wherein an alert of the plurality of alerts comprises a plurality of dependencies, each dependency of the plurality of dependencies defining a relationship to a different alert of the plurality of alerts.

20. The computer-readable storage media of claim 17, wherein classifying the alert with respect to the cyber kill chain comprises classifying the alert as indicative of one or more steps of an IT cyber kill chain and/or an ICS cyber kill chain.

* * * * *